US010817055B2

(12) United States Patent
Sumi (10) Patent No.: US 10,817,055 B2
(45) Date of Patent: Oct. 27, 2020

(54) AUTO-STEREOSCOPIC DISPLAY DEVICE (71) Applicant: InnoLux Corporation, Miao-Li County (TW)

(72) Inventor: Naoki Sumi, Miao-Li County (TW)

(73) Assignee: InnoLux Corporation, Miao-Li County (TW)

(*) Notice: Subject to any disclaimer, the term of this patent is extended or adjusted under 35 U.S.C. 154(b) by 0 days.

(21) Appl. No.: 16/158,254

(22) Filed: Oct. 11, 2018

(65) Prior Publication Data

US 2019/0361524 A1    Nov. 28, 2019

Related U.S. Application Data (60) Provisional application No. 62/675,773, filed on May 24, 2018.

(51) Int. Cl.
*G06F 3/01* (2006.01)
*H04N 13/111* (2018.01)
*G02B 27/00* (2006.01)
*G06T 15/06* (2011.01)

(52) U.S. Cl.
CPC ......... *G06F 3/013* (2013.01); *G02B 27/0093* (2013.01); *H04N 13/111* (2018.05); *G06T 15/06* (2013.01)

(58) Field of Classification Search
CPC ... G06F 3/013; H04N 13/111; G02B 27/0093; G06T 15/06
See application file for complete search history.

(56) References Cited

U.S. PATENT DOCUMENTS

| | | | | |
|---|---|---|---|---|
| 5,712,732 A | * | 1/1998 | Street | G02B 27/0093 359/630 |
| 10,623,714 B2 | * | 4/2020 | Sumi | H04N 13/383 |
| 2005/0083246 A1 | * | 4/2005 | Saishu | H04N 13/31 345/1.1 |
| 2009/0052027 A1 | * | 2/2009 | Yamada | G02B 30/27 359/463 |
| 2013/0286053 A1 | * | 10/2013 | Fleck | G09G 3/3208 345/690 |
| 2013/0293547 A1 | | 11/2013 | Du | |
| 2013/0321595 A1 | * | 12/2013 | Saishu | H04N 13/305 348/51 |
| 2014/0210875 A1 | * | 7/2014 | Sumi | G09G 3/00 345/694 |
| 2014/0300711 A1 | * | 10/2014 | Kroon | H04N 13/302 348/51 |
| 2015/0249818 A1 | * | 9/2015 | Murao | G02B 30/27 348/59 |
| 2016/0323570 A1 | * | 11/2016 | Kim | H04N 13/31 |
| 2017/0353716 A1 | * | 12/2017 | Shin | H04N 13/327 |
| 2018/0143683 A1 | * | 5/2018 | Kang | H04N 13/383 |
| 2019/0364258 A1 | * | 11/2019 | Sumi | H04N 13/305 |

* cited by examiner

Primary Examiner — Afroza Chowdhury
(74) Attorney, Agent, or Firm — Winston Hsu (57) ABSTRACT A display device includes a display, an optical modulator, an eye tracking module, and a controller. The display module includes a plurality of pixels. The optical modulator is disposed on the display module and modulates the light emitted from the display module to corresponding directions. The eye tracking module tracks the positions of a viewer's eyes. The controller defines an eye-to-eye line passing through the positions of the viewer's eyes, and generates image data of the plurality of pixels according to a plurality of viewing positions on the eye-to-eye line.

16 Claims, 8 Drawing Sheets

AUTO-STEREOSCOPIC DISPLAY DEVICE

CROSS REFERENCE TO RELATED APPLICATION

This non-provisional application claims priority of U.S. provisional application No. 62/675,773, filed on May 24, 2018, included herein by reference in its entirety.

BACKGROUND OF THE DISCLOSURE

1. Field of the Disclosure

The present disclosure is related to a display device, and more particularly, to a display device capable of presenting auto-stereoscopic visual effect.

2. Description of the Prior Art

To present natural three dimensional (3D) images on the display devices without using glasses, light field displays and super multi-view displays have been developed. For example, when displaying an object by a light field display, the light field display can use lenticular lenses to direct the images of different views of the object to different directions so viewers at different positions can watch different views of the object. In this case, by providing images of appropriate viewing angles to the right eye and the left eye of the viewer, the viewer would be able to sense the 3D visual effect.

In prior art, the viewing angles of the object and the number of viewing angles to be displayed are predetermined and limited. However, the standing positions and the viewing directions of the viewers are unpredictable; therefore, viewers are often troubled by not watching the display in an appropriate manner. For example, if a viewer watches the display with his head yawed or rolled, the viewer may see images of inconsistent viewing angles, and the quality of 3D visual effect would be poor and may cause headache or dizziness sometimes.

SUMMARY OF THE DISCLOSURE

One embodiment of the present disclosure discloses a display device. The display device includes a display module, an optical modulator, an eye tracking module, and a controller.

The display module includes a plurality of pixels. The optical modulator is disposed on the display module and modulates the light emitted from the display module to corresponding directions. The eye tracking module tracks the positions of a viewer's eyes. The controller defines an eye-to-eye line passing through the positions of the viewer's eyes, and generates the image data of the plurality of pixels according to a plurality of viewing positions on the eye-to-eye line.

Another embodiment of the present disclosure discloses a method for operating a display device. The display device comprises an optical modulator, an eye tracking module, a controller, and a display module having a plurality of pixels.

The method for operating the display device comprises tracking positions of a viewer's eyes by the eye tracking module, defining an eye-to-eye line passing through the positions of the viewer's eyes by the controller, generating image data of the plurality of pixels according to a plurality of viewing positions on the eye-to-eye line by the controller, displaying the image data generated by the controller on the display module, and modulating light emitted from the display module to corresponding directions by the optical modulator.

These and other objectives of the present disclosure will no doubt become obvious to those of ordinary skill in the art after reading the following detailed description of the embodiment that is illustrated in the various figures and drawings.

DETAILED DESCRIPTION

Figure 1:
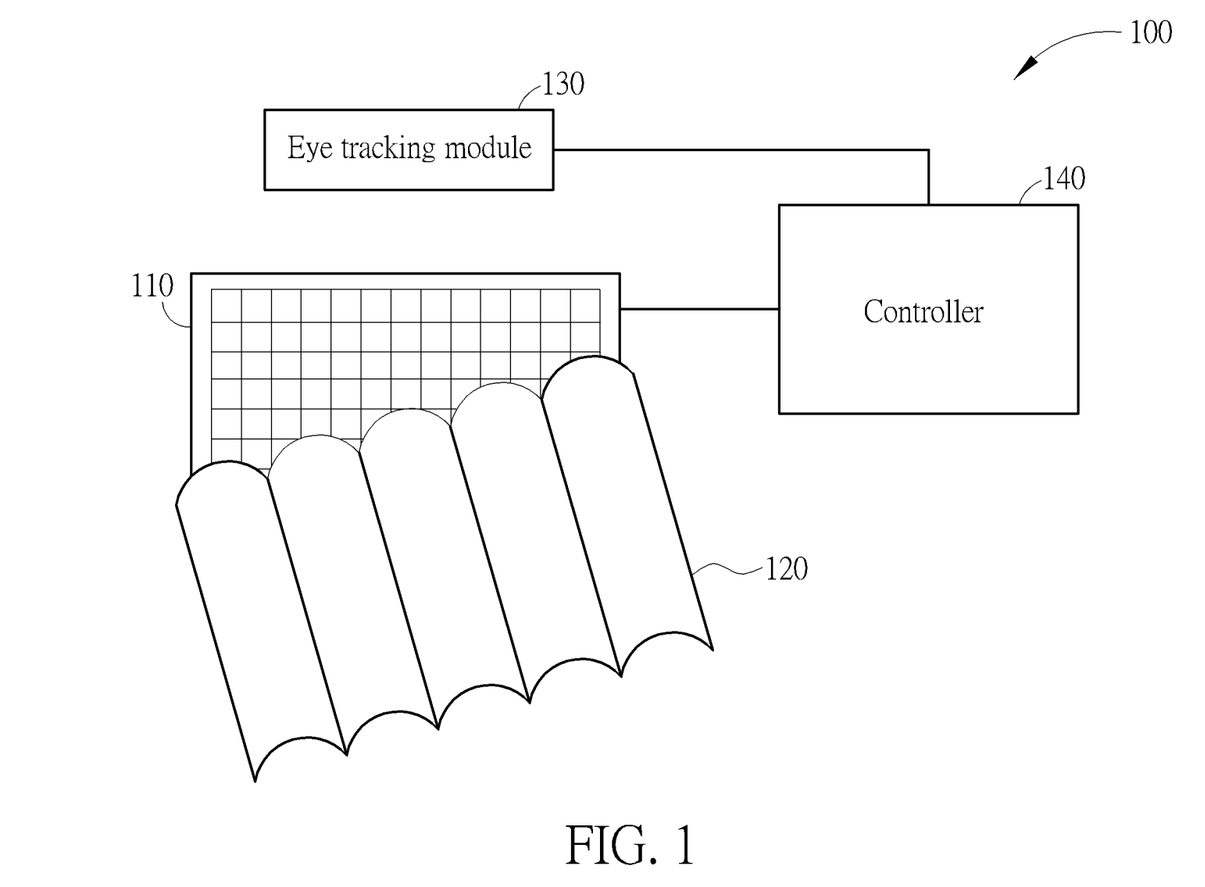
FIG. 1 shows a display device according to one embodiment of the present disclosure.

FIG. 1 shows a display device 100 according to one embodiment of the present disclosure. The display device 100 can include a display module 110, an optical modulator 120, an eye tracking module 130, and a controller 140. The controller 140 can be coupled to the eye tracking module 130 and the display module 110.

In some embodiments, the display module 110 can be at least one of an organic light emitting diode (OLED) display module, a quantum light emitting diode (QLED) display module, a mini light emitting diode (mini-LED) display module, a micro light emitting diode (micro-LED) display module, or a liquid crystal display (LCD) module, but it is not limited thereto.

The optical modulator 120 can be disposed on the display module 110 so the optical modulator 120 can modulate the light emitted from the display module 110 to corresponding directions. In some embodiments, the optical modulator 120 includes at least one of a lenticular film, liquid crystal (LC) grin lenses, parallax barriers, or LC parallax barriers, but it is not limited thereto.

Figure 2:
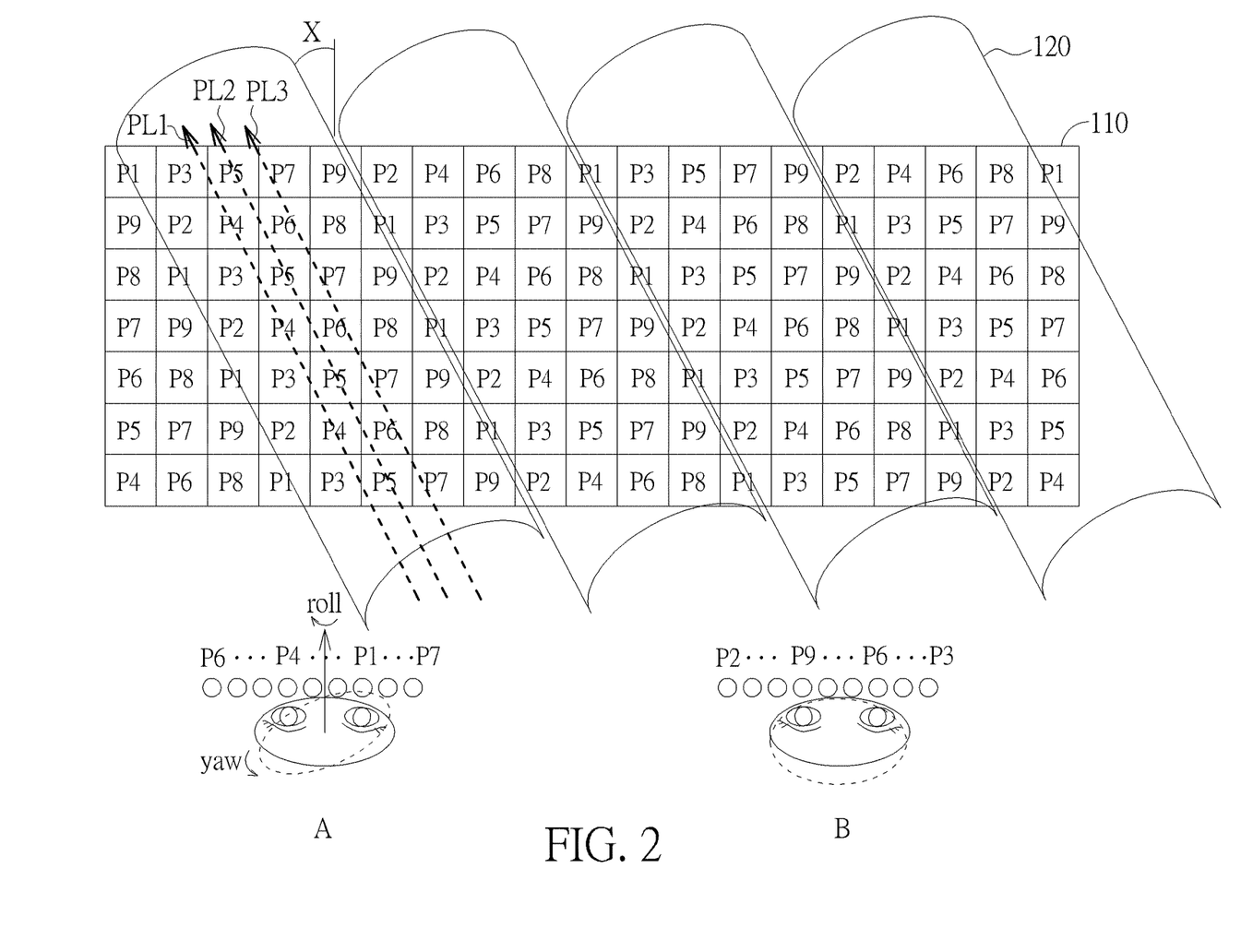
FIG. 2 shows the viewing pattern of the display module and the optical modulator according to one embodiment of the present disclosure.

FIG. 2 shows the viewing pattern of the display module 110 and the optical modulator 120 according to one embodiment of the present disclosure. In FIG. 2, the display module 110 includes a plurality of pixels, and the pixels can be divided into nine groups P1 to P9 for presenting images for nine different viewing angles. For example, pixels P1 are used to present the image for a first viewing angle, and pixels P2 are used to present the image for a second viewing angle, and so on. In FIG. 2, different groups of pixels are arranged in parallel. For example, viewing lines PL1, PL2, and PL3 are in parallel and mainly formed by pixels P4, P5 and P6 respectively. Therefore, as the viewer shifts her/his viewing position, the viewer may first see the image presented by pixels P4, the image presented by pixels P5, and then the image presented by pixels P6.

However, the present disclosure does not limit the display module 110 to providing nine different views. In some other embodiments of the present disclosure, the display module 110 may provide less or more views, and may have different pixel patterns according to the specification of the optical modulator 120 and the display module 110. Furthermore, in FIG. 2, the skew angle X between the optical modulator 120 and the display module 110 can be greater than zero degrees so that the images for different viewing angles can be diffused to reduce the sharp change between different views. That is, the skew angle X can be decided according to the system requirement, and may be 0 degrees in some embodiments.

The optical modulator 120 can direct the light emitted from the pixels to the corresponding directions. In the present embodiment, the order of the viewing directions modulated by the optical modulator 120 can be opposite to the order of the viewing lines arranged in the display module 110. For example, in the display module 110, the viewing lines formed by pixels P1 to pixels P9 are arranged from left to right; however, when moving from left to right, the viewer may actually see the image formed by pixels P9 to the image formed by pixels P1 sequentially due to the modulation caused by the optical modulator 120.

Therefore, if the viewer watches the display module 110 from the point A, the viewer may see the image provided by pixels P1 by her/his right eye, and may see the image provided by pixels P4 by her/his left eye. Similarly, if the viewer watches the display module 110 from the point B, the viewer may see the image provided by pixels P6 by her/his right eye, and may see the image provided by pixels P9 by her/his left eye.

Since the viewer's right eye and the left eye can receive images of different viewing angles, the 3D visual effect can be delivered by the display device 100. However, in prior art, the viewing angles provided by pixels P1 to P9 are predetermined and limited. Therefore, in an ideal case, the viewer may see the image provided by pixels P1 by her/his right eye and see the image provided by pixels P4 by her/his left eye, so the 3D visual effect can be delivered correctly. However, if the viewer yaws or rolls her/his head, than the viewer may see the image provided by pixels P2 by her/his right eye, and see the image provided by pixels P3 by her/his left eye. In this case, since the viewing angles provided by pixels P2 and P3 may be too close and are not consistent to form the 3D visual effect, the viewer may sense the incorrect depth information and feel dizzy.

To improve the 3D visual effects and allow the viewer to watch the display device 100 casually without concerning about the limited viewing positions, the display device 100 can use the eye tracking module 130 to track the positions of the viewer's eyes. Also, the controller 140 will define an eye-to-eye line passing through the positions of the viewer's eyes, and generate the image data of the pixels in the display module 110 according to a plurality of viewing positions on the eye-to-eye line. Consequently, the display device 100 would be able to present the auto-stereoscopic visual effect with better quality and less limitation.

Figure 3:
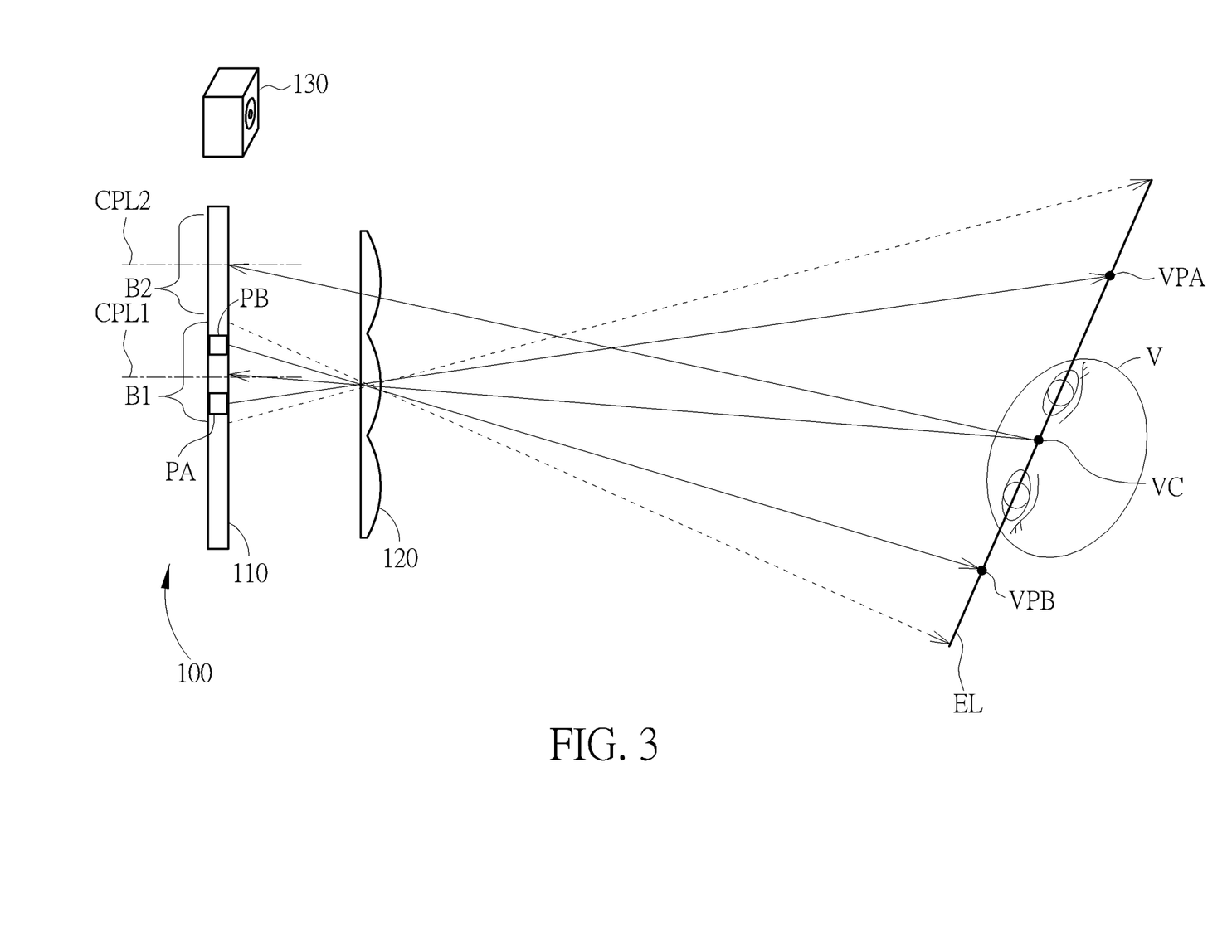
FIG. 3 shows a viewing scenario of the display device in FIG. 1 according to one embodiment of the present disclosure.

FIG. 3 shows a viewing scenario of the display device 100 according to one embodiment of the present disclosure. In FIG. 3, the viewer V watches the display device 100 with her/his head slightly turned (or yawed). To provide the images for the viewer V, the eye tracking module 130 can detect the positions of the right eye and the left eye of the viewer V. The controller 140 can derive the center position VC of viewer's eyes according to positions of the eyes of the viewer V.

Figure 4:
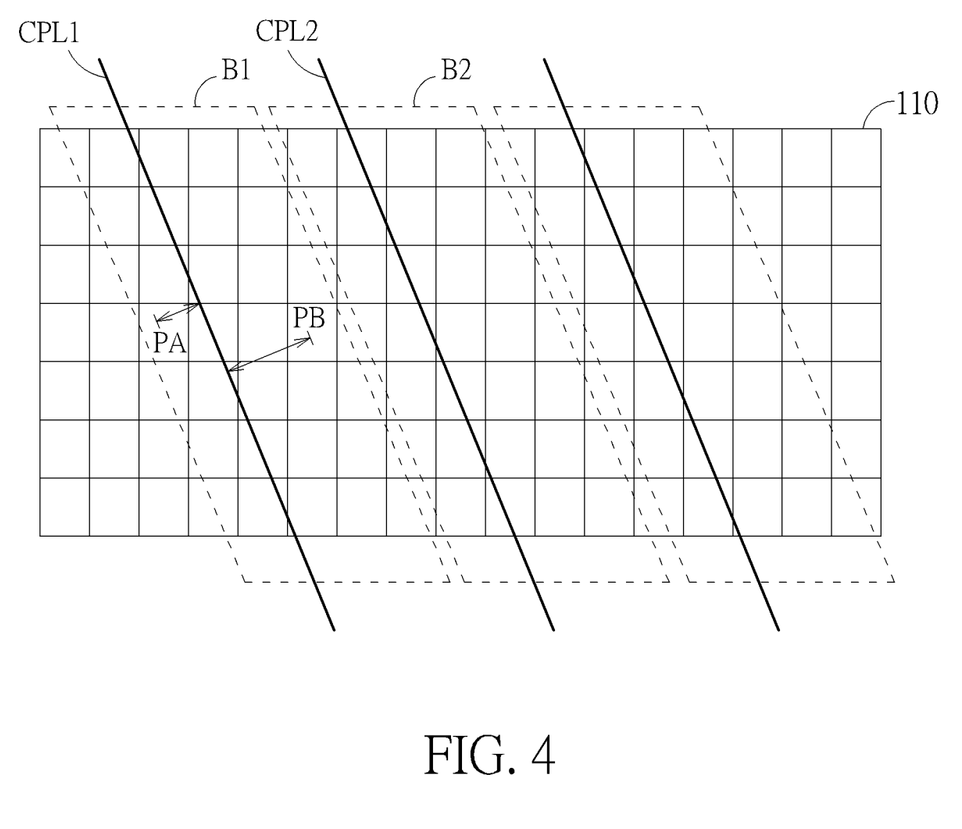
FIG. 4 shows the center projection lines on the display module in FIG. 1 according to one embodiment of the present disclosure.

Afterwards and please also refer to FIG. 1, the controller 140 can define the center projection line CPL1 on the display module 110 corresponding to the center position VC of the viewer's eyes. The center projection line CPL1 can indicate the central pixels that should be seen from the center position VC of the viewer's eyes through the optical modulator 120. FIG. 4 shows the center projection lines on the display module 110 according to one embodiment of the present disclosure.

Since the center projection line CPL1 is also related to the placement of the optical modulator 120 and the display module 110, the controller 140 may define the center projection line CPL1 according to parameters related to the optical modulator 120 and the display module 110. For example, the parameters can include at least one of the lenticular pitch of the optical modulator 120, the curvatures of the optical modulator 120, and the skew angle between the optical modulator 120 and the display module 110. Also, in this case, the optical gap between the display module 110 and the optical modulator 120 can be fixed. In some embodiments, these parameters may be decided during manufacturing, and can be recorded in the memory of the controller 140. With the required parameters, the controller 140 would be able to derive the center projection line CPL1 according to the center position VC of the viewer's eyes.

In some embodiments, to derive the center projection line CPL1 even more accurately, the controller 140 may also use the parameters derived by calibration. For example, the parameters related to the optical modulator 120 and the display module 110 used by the controller 140 may further include the distance between viewer's eyes and the eye angle offset, in one embodiment, the eye angle offset could be a natural angle between the horizontal direction of the display module 110 and the eye-to-eye line of a viewer. Consequently, some of the errors caused in the manufacturing process and some of the unknown conditions preset in the manufacturing process can be corrected.

In some embodiments, the pixels in the display module 110 are disposed in repetitive pattern blocks, and the controller 140 may find a plurality of center projection lines corresponding to the different pattern blocks. For example, the controller 140 may derive the center projection line CPL1 for the pattern block B1, and derive the center projection line CPL2 for the pattern block B2 as shown in FIG. 3 and FIG. 4.

After the center projection line CPL1 is derived, the controller 140 can further derive the modulator-to-pixel offsets for the pixels in the pattern block B1 each according to the distance between a reference point of a pixel and the corresponding center projection line. That is, for each pixel in the pattern block B1, the modulator-to-pixel offsets can be derived. In some embodiments, the reference point of the pixel can be, for example, but not limited to, the center point of the pixel.

According to the modulator-to-pixel offsets of the pixels in the pattern block B1, the controller 140 can derive the viewing positions on the eye-to-eye line EL corresponding to the pixels in the pattern block B1. That is, for each pixel in the pattern block B1, the controller 140 can derive the corresponding viewing positions on the eye-to-eye line EL that will see the pixel. For example, in FIG. 3, the controller 140 may derive the viewing position VPA corresponding to the pixel PA, and may derive the viewing position VPB corresponding to the pixel PB. In this case, the pixel PA will display the image data that is supposed to be watched at the viewing position VPA, and the pixel PB will display the image data that is supposed to be watched at the viewing position VPB.

Since the eye-to-eye line EL are defined by extending the connecting line between the eyes of the viewer V, the eye-to-eye line EL will be varied as the viewer yaws or rolls her/his head. Therefore, by defining the viewing positions on the eye-to-eye line, the image data presented by the pixels generated by the controller 140 would match with the actual viewing direction of the viewer V, reducing the defects seen by the viewer and increasing the visual quality.

In the present embodiment, the ray tracing algorithm can be adopted to generate the images of the scene to be displayed. In this case, the controller 140 can derive the ray vectors corresponding to the pixels according to the viewing positions, and generate the image data for the pixels by sampling the light intensities in the scene along the derived ray vectors.

Figure 5:
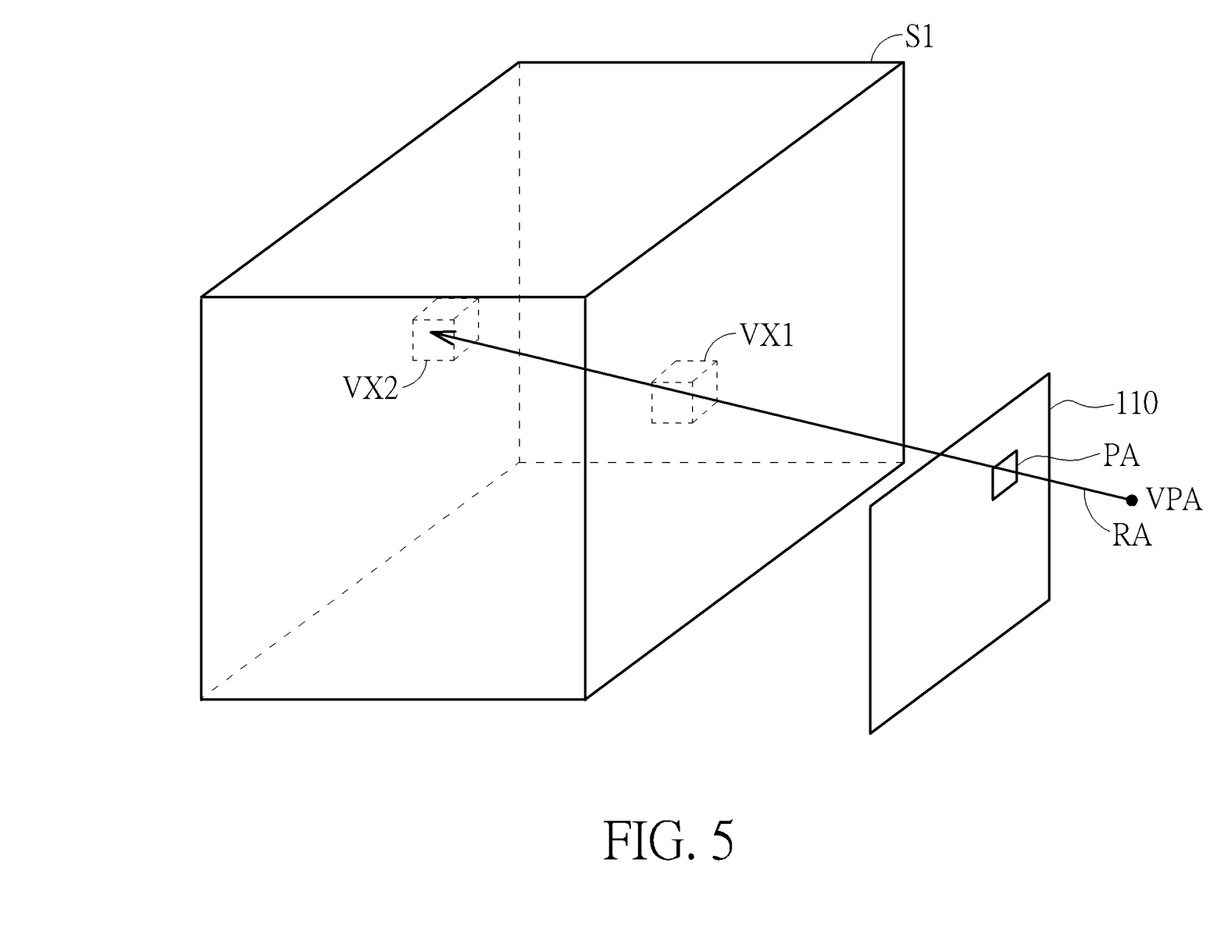
FIG. 5 shows a scene to be displayed by the display module in FIG. 1 according to one embodiment of the present disclosure.

FIG. 5 shows a scene S1 to be displayed by the display module 110 according to one embodiment of the present disclosure. In FIG. 5, the scene S1 to be displayed can be formed by a plurality of voxels, and each voxel includes color information and brightness information. In this case, if the viewing position VPA is corresponding to the ray vector RA, the controller 140 will check the voxels along the ray vector RA, and decide the color and brightness of the pixel PA according to the color information and brightness information recorded in the voxels along the ray vector RA. For example, in FIG. 5, the ray vector RA may pass through the voxels VX1 and VX2 so the information stored in the voxels VX1 and VX2 may be processed by the controller 140 and presented by the pixel PA. In some embodiments, the controller 140 can generate the image data of the pixel PA by combining color and brightness information recorded in multiple voxels with proper weightings.

Figure 6:
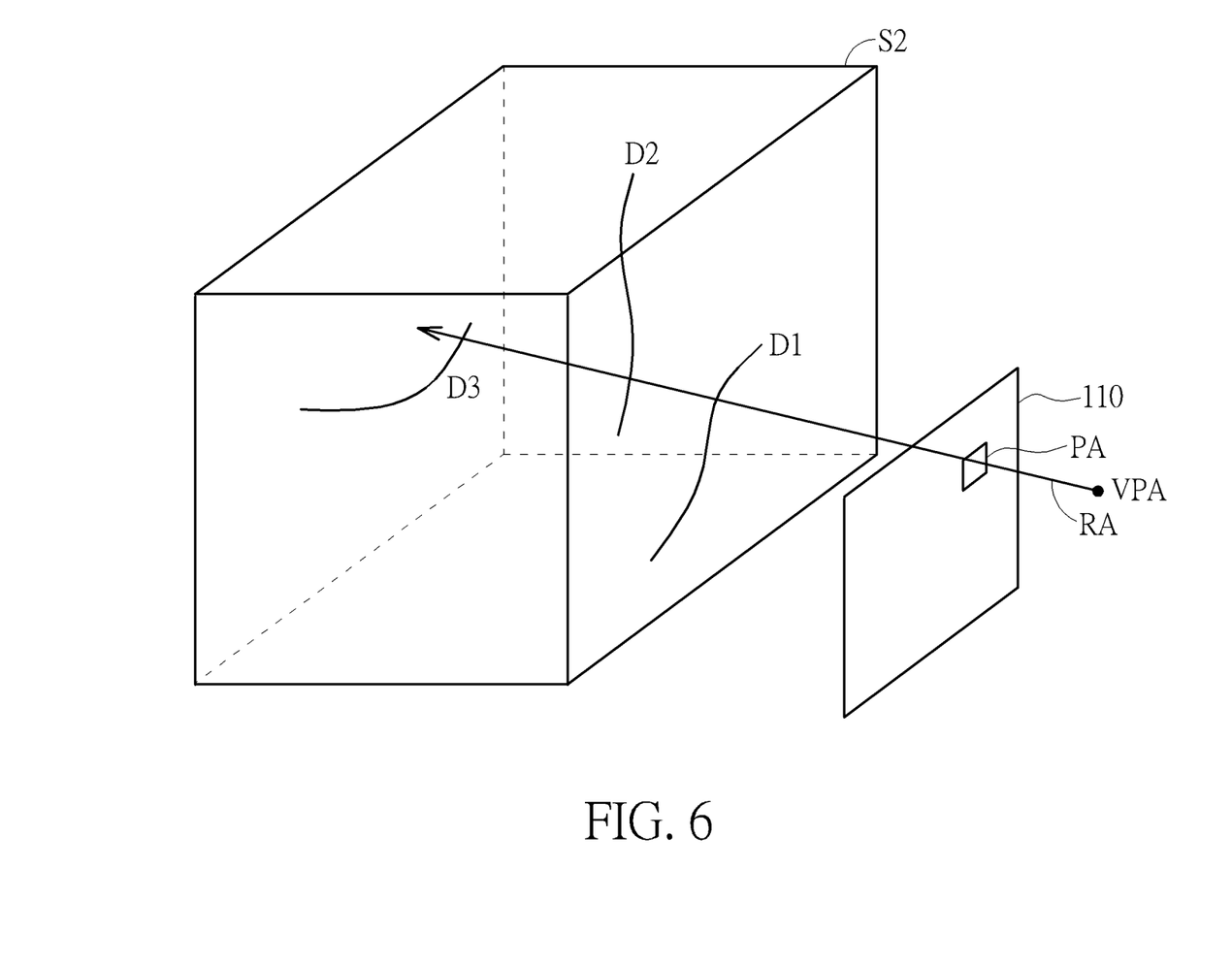
FIG. 6 shows a scene to be displayed by the display module in FIG. 1 according to one embodiment of the present disclosure.

However, in some other embodiments of the present disclosure, the scene to be displayed may be formed with different structures. For example, the scene can be formed by a plurality of depth planes, and each of the depth planes can include a plurality of points with corresponding color information, transparency information, and brightness information. FIG. 6 shows a scene S2 to be displayed by the display module 110 according to one embodiment of the present disclosure. The scene S2 can be formed by the depth planes D1 to D3. In FIG. 6, if the viewing position VPA is corresponding to the ray vector RA, the controller 140 will check the points on the depth planes D1 to D3 along the ray vector RA, and decide the color and brightness of the pixel PA according to the color information, the transparency information, and the brightness information recorded in the points on the depth planes D1 to D3.

In some embodiments, each of the depth planes D1 to D3 may have the transparent area and opaque area. The opaque area can have a 2D or 3D surface, and will block other planes behind it. For example, the depth plane D1 may include objects in the foreground, and the depth plane D3 may include objects in the background. Therefore, the objects shown by the depth plane D1 may block the objects shown in the depth plane D3. Since the structure of depth planes is rather simple, it can be generated by 3D rendering engine in real-time.

Since the display device 100 can use the eye tracking module 130 to track the positions of the viewer's eyes and generate the image data for each pixel according to the viewing positions of the pixel on the eye-to-eye line, the images presented by the display module 110 will be compliant with the viewing position and the viewing direction of the viewer. That is, the viewer can always watch the images with corresponding viewing angles even when the viewer yaws or rolls her/his head. In prior art, the display device presents images only for predetermined viewing angles, so when the viewer yaws or rolls her/his head, the viewer may see the images for inconsistent viewing angles, and the 3D visual effect would be poor. Therefore, the display device 100 can provide better visual quality than the prior art, this advantage becomes more notable when the viewer yaws or rolls the viewer's head.

Furthermore, since the viewing angles to be presented can be determined by the controller 140 according to the eye-to-eye line in real time, the display device 100 can provide a wider view than the prior art providing only predetermined and limited viewing angles. That is, in prior art, the display device only presents images for limited and predetermined viewing angles, so if the viewer is moving, the viewer will see the images with repetitive viewing angles. However, with the display device 100, the controller 140 can generate the images of different viewing angles corresponding to the position of the viewer. Therefore, the viewer would be able to see a wider view of the same scene.

In addition, in some embodiments, if the eye tracking module 130 detects the change of the eye positions of the viewer, the controller 140 may further determine if the change of the positions is greater than a threshold. If the change is rather small and does not exceed the threshold, the controller 140 may not generate the new image data. Otherwise, if the change is greater than the threshold, the controller 140 will generate the new image data corresponding to the eye positions of the viewer. That is, the display device 100 can generate the new image data according to the new eye positions of the viewer when the change of the eye positions is large enough to be sensed by the viewer, reducing computation effort if the change of the eye positions is insignificant.

In the present embodiment, although the display device 100 may generate the 3D visual effect by providing the images of different viewing angles for one viewer by tracking her/his eyes, a second viewer can also sense the 3D visual effect according to the images provided by the display device 100 if the second viewer is close enough to the first viewer and share the same eye-to-eye line as the first viewer.

Figure 7:
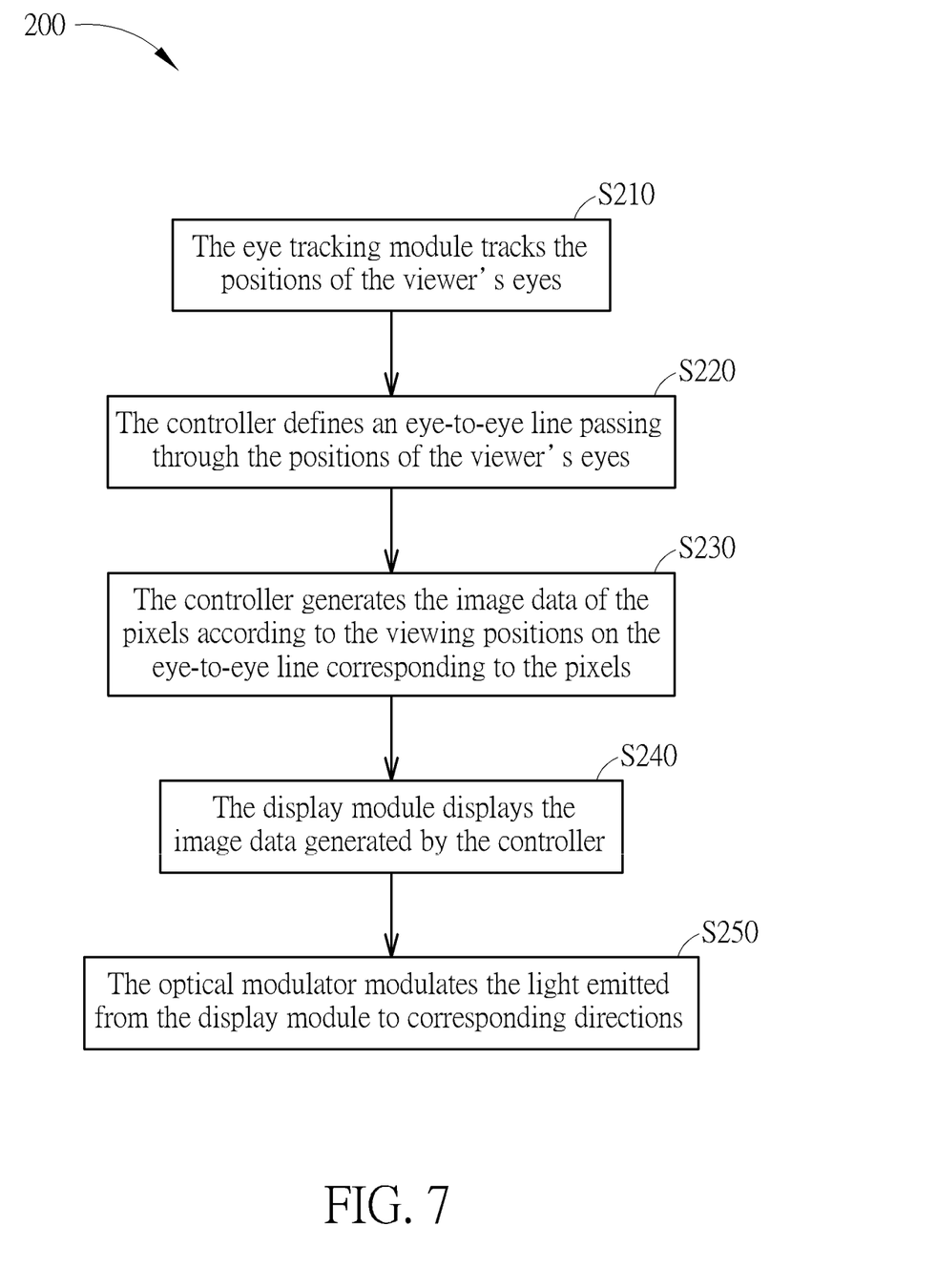
FIG. 7 shows a flowchart of a method for operating the display device in FIG. 1 according one embodiment of the present disclosure.

FIG. 7 shows a flow chart of a method 200 for operating display device 100 according one embodiment of the present disclosure. The method 200 includes steps S210 to S250.

S210: tracking, by the eye tracking module 130, the positions of the viewer's eyes;

S220: defining, by the controller 140, an eye-to-eye line passing through the positions of the viewer's eyes;

S230: generating, by the controller 140, the image data of the plurality of pixels according to the viewing positions on the eye-to-eye line;

S240: displaying, by the controller 140, the image data generated on the display module; and S250: modulating, by the optical modulator 120, the light emitted from the display module 110 to corresponding directions.

According to the positions of the viewer's eyes tracked by the eye tracking module 130 in step S210, the controller 140 can further define the eye-to-eye line. Since the eye-to-eye line changes when the viewer changes her/his viewing direction by yawing or rolling her/his head, the eye-to-eye line can help to imply the correct viewing positions of the pixels in the display module 110. Therefore, in step S230, the controller 140 can generate the image data of the pixels according to the viewing positions on the eye-to-eye line. Afterwards, the display module 110 can display the image data generated by the controller 140 in step S240, and the optical module 110 can modulate the light emitted from the display module 110 to the corresponding directions in step S250.

Figure 8:
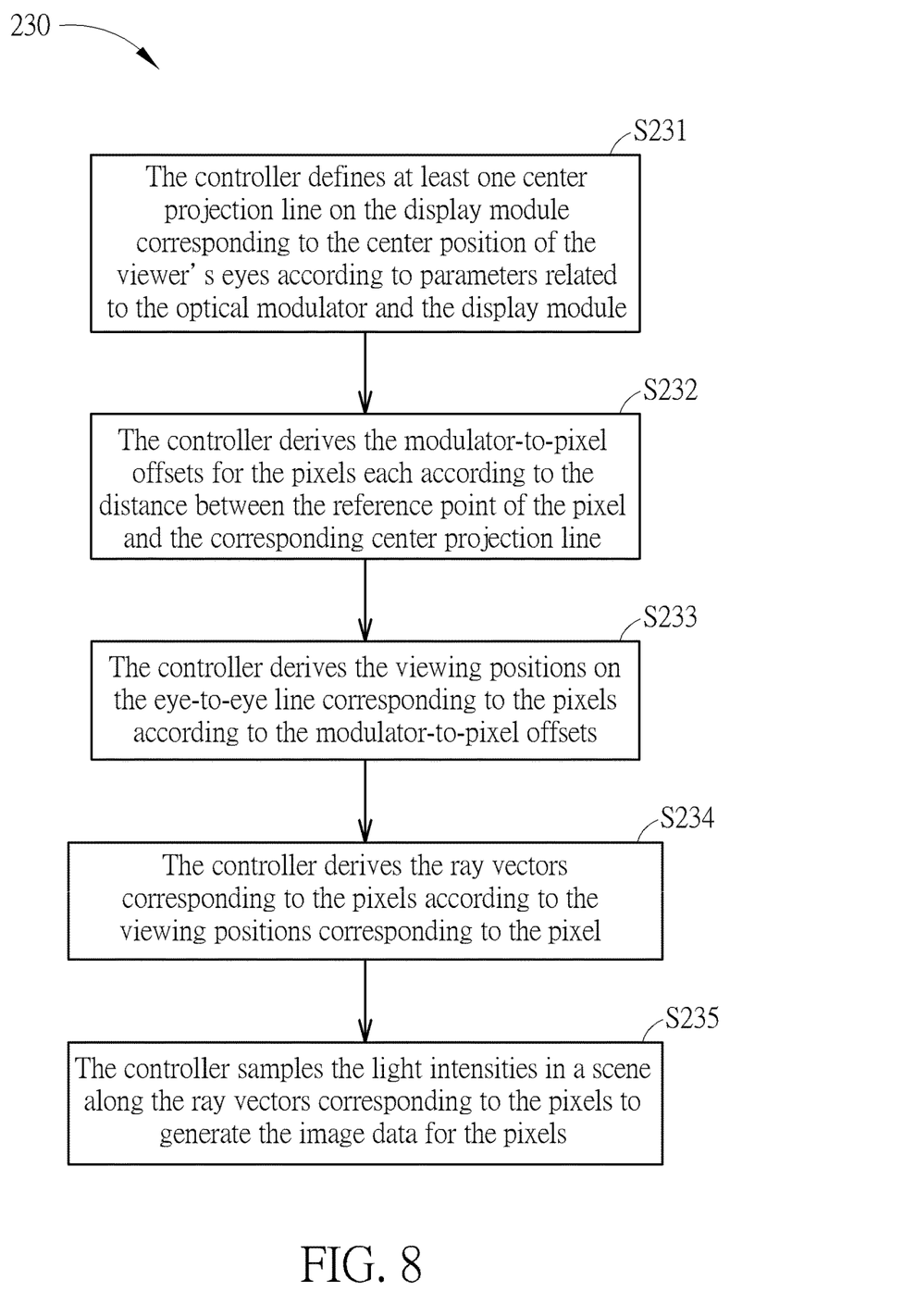
FIG. 8 shows a flowchart of a step in FIG. 7.

FIG. 8 shows a flowchart of the step S230. In FIG. 8, the step S230 can include the steps S231 to S235.

S231: defining, by the controller 140, at least one center projection line on the display module 110 corresponding to the center position of the viewer's eyes according to parameters related to the optical modulator 120 and the display module 110;

S232: deriving, by the controller 140, the modulator-to-pixel offsets for the pixels each according to the distance between the reference point of the pixel and the corresponding center projection line;

S233: deriving, by the controller 140, the viewing positions on the eye-to-eye line EL corresponding to the pixels according to the modulator-to-pixel offsets;

S234: deriving, by the controller 140, the ray vectors corresponding to the pixels according to the viewing positions corresponding to the pixels; and S235: sampling, by the controller 140, the light intensities in a scene along the ray vectors corresponding to the pixels to generate the image data for the pixels.

In step S231, the controller 140 can define the center projection lines on the display module 110, such as the center projection line CPL1 and CPL2 in FIG. 3 and FIG. 4. The center projection lines CPL1 and CPL2 can indicate the central pixels that should be seen from the center of the viewer's eyes through the optical modulator 120.

Later, in step S232, the controller 140 will derive the modulator-to-pixel offsets for the pixels according to the distances between the reference points of the pixels and the corresponding center projection line derived in step S231. With the modulator-to-pixel offsets, the controller 140 would derive the viewing positions on the eye-to-eye line corresponding to the pixels in step S233.

In steps S234 and S235, the viewing positions derived in step S233 will be used to generate the images data according to the ray tracing algorithms.

Consequently, the method 200 can track the positions of the viewer's eyes and generate the image data for each pixel according to the viewing positions of the pixel on the eye-to-eye line. Therefore, the images presented by the display module 110 will accord with the viewing position and the viewing direction of the viewer. That is, with the method 200, the display module 110 would be able to provide a wider view of a scene with better visual quality.

In summary, the display device and the method for operating the display device can track the positions of the viewer's eyes and generate the image data for each pixel according to the viewing positions of the pixel on the eye-to-eye line. Therefore, the images presented by the display module 110 will according to the viewing position and the viewing direction of the viewer, resulting in a wider view with better visual quality.

Also, to determine whether the present disclosed display device has been infringed, the display device at issue can be used to show a 3D cube model, for example a 10 cm×10 cm×10 cm cube. In this case, fake eye balls or real eye balls can be placed in several angles, simulating the yawing, the pitching or the rolling of the head, and the 3D pictures or the light fields can be captured in every position on the eye to eye line. Afterwards, the virtual camera positions corresponding to the perspective shape changes of the cube model can be analyzed and calculated. If the virtual camera positions vary dynamically, namely, if the axis changes flexibly along the eye to eye line, the display device at issue has infringed the present disclosed display device.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A display device comprising:
a display module comprising a plurality of pixels;
an optical modulator disposed on the display module and configured to modulate light emitted from the display module to corresponding directions; and
a controller configured to:
define an eye-to-eye line passing through positions of a viewer's eyes,
define at least one center projection line on the display module corresponding to a center position of the viewer's eyes according to parameters related to the optical modulator and the display module,
derive modulator-to-pixel offsets for the plurality of pixels each according to a distance between a reference point of a pixel and a corresponding center projection line of the at least one center projection line,
derive a plurality of viewing positions on the eye-to-eye line corresponding to the plurality of pixels according to the modulator-to-pixel offsets, and
generate image data of the plurality of pixels according to the plurality of viewing positions on the eye-to-eye line;
wherein the at least one center projection line is defined by central pixels being seen from the center position of the viewer's eyes through the optical modulator.

2. The display device of claim 1, wherein:
the parameters comprise at least one of a lenticular pitch of the optical modulator, curvatures of the optical modulator, and a skew angle between the optical modulator and the display module.

3. The display device of claim 2, wherein the parameters further comprise a distance between viewer's eyes and eye angle offset derived by calibration.

4. The display device of claim 1, wherein:
the controller derives a plurality of ray vectors corresponding to the plurality of pixels according to the plurality of viewing positions.

5. The display device of claim 4, wherein:
the controller generates the image data for the plurality of pixels by sampling light intensities in a scene along the plurality of ray vectors.

6. The display device of claim 5, wherein the scene is formed by a plurality of voxels comprising color information and brightness information.

7. The display device of claim 5, wherein the scene is formed by a plurality of depth planes each comprising a plurality of points with corresponding color information, transparency information, and brightness information.

8. The display device of claim 1, wherein the display module comprises at least one of an organic light emitting diode display module, a quantum light emitting diode display module, a mini light emitting diode display module, a micro light emitting diode display module, or a liquid crystal display module.

9. The display device of claim 1, wherein the optical modulator comprises at least one of a lenticular film, liquid crystal (LC) grin lenses, parallax barriers, or LC parallax barriers.

10. The method of claim 1, wherein the generating, by the controller, the image data of the plurality of pixels according to the plurality of viewing positions on the eye-to-eye line further comprises:
deriving, by the controller, a plurality of ray vectors corresponding to the plurality of pixels according to plurality of viewing positions.

11. The method of claim 10, wherein the generating, by the controller, the image data of the plurality of pixels according to the plurality of viewing positions on the eye-to-eye line further comprises:
sampling, by the controller, light intensities in a scene along the plurality of ray vectors corresponding to the plurality of pixels to generate the image data for the plurality of pixels.

12. The method of claim 11, wherein the scene is formed by a plurality of voxels comprising color information and brightness information.

13. The method of claim 11, wherein the scene is formed by a plurality of depth planes, each comprising a plurality of points with corresponding color information, transparency information, and brightness information.

14. A method for operating display device, the display device comprising an optical modulator, a controller, and a display module having a plurality of pixels, and the method comprising:
defining, by the controller, an eye-to-eye line passing through positions of a viewer's eyes;
generating, by the controller, image data of the plurality of pixels according to a plurality of viewing positions on the eye-to-eye line;
displaying, by the controller, the image data generated on the display module; and
modulating, by the optical modulator, light emitted from the display module to corresponding directions;
wherein generating, by the controller, the image data of the plurality of pixels according to the plurality of viewing positions on the eye-to-eye line comprises:
defining, by the controller, at least one center projection line on the display module corresponding to a center position of the viewer's eyes according to parameters related to the optical modulator and the display module;
deriving, by the controller, modulator-to-pixel offsets for the plurality of pixels each according to a distance between a reference point of a pixel and a corresponding center projection line; and
deriving, by the controller, the plurality of viewing positions on the eye-to-eye line corresponding to the plurality of pixels according to the modulator-to-pixel offsets;
wherein the at least one center projection line is defined by central pixels being seen from the center position of the viewer's eyes through the optical modulator.

15. The method of claim 14, wherein:
the parameters comprise at least one of a lenticular pitch of the optical modulator, curvatures of the optical modulator, and a skew angle between the optical modulator and the display module.

16. The method of claim 15, wherein the parameters further comprise a distance between eyes and eye angle offset derived by calibration.

* * * * *